(12) United States Patent
Takashima (10) Patent No.: US 8,666,592 B2
(45) Date of Patent: Mar. 4, 2014

(54) IN-VEHICLE AUDIO/VISUAL APPARATUS

(75) Inventor: Ryo Takashima, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 948 days.

(21) Appl. No.: 12/104,790

(22) Filed: Apr. 17, 2008

(65) Prior Publication Data

US 2008/0266067 A1    Oct. 30, 2008

(30) Foreign Application Priority Data

Apr. 24, 2007 (JP) ................................ 2007-114408

(51) Int. Cl.
*G06F 7/00* (2006.01)
*G06F 3/048* (2013.01)

(52) U.S. Cl.
USPC ............... 701/36; 725/75; 725/76; 725/77; 725/133; 725/141; 725/153; 715/867; 715/727

(58) Field of Classification Search
None
See application file for complete search history.

(56) References Cited

U.S. PATENT DOCUMENTS

| 2003/0215102 | A1* | 11/2003 | Marlowe | 381/77 |
| 2005/0281414 | A1* | 12/2005 | Simon et al. | 381/86 |
| 2006/0031617 | A1* | 2/2006 | Falcon | 710/303 |
| 2007/0220562 | A1* | 9/2007 | Janssen et al. | 725/81 |

FOREIGN PATENT DOCUMENTS

| JP | 5-122424 | 5/1993 |
| JP | 7-274049 | 10/1995 |
| JP | 7-336778 | 12/1995 |
| JP | 9-163258 | 6/1997 |
| JP | 11-168574 | 6/1999 |
| JP | 2001-128280 | 5/2001 |
| JP | 2001-194164 | 7/2001 |
| JP | 2002-252887 | 9/2002 |
| JP | 2005-65118 | 3/2005 |
| JP | 2005-333293 | 12/2005 |
| WO | WO 2005/043484 A1 | 5/2005 |

OTHER PUBLICATIONS

Setting Up Remote Desktop in Windows XP—Tech Tips 83—Remote Desktop, XP,.pdf (Shane McGlaun, Tech Tip 83—Setting Up Remote Desktop in Windows XP, Aug. 22, 2006, http:/www.geeks.com/techtips/2006/techtips-22jun06.htm, pp. 1-7, archived on wayback machine).*
http_www.windowsnetworking.pdf (Johannes Helmig, How to use remote Desktop Access in Windows XP, Dec. 18, 2001, http://www.windowsnetworking.com/articles-tutorials/windows-xp/wxprmdtp.html, pp. 1-9).*
Windows Remote Desktop Connection.pdf (John Ward, Windows Remote Desktop Connection, Mar. 18, 2007, http://teamtutorials.com/windows-tutorials/windows-remote-desktop-connection, pp. 2-18).*
Office Action issued on Jan. 25, 2011 in Japanese Patent Application No. 2007-114408 (with English Translation).

* cited by examiner

*Primary Examiner* — Khoi Tran
*Assistant Examiner* — Bao Long T Nguyen
(74) *Attorney, Agent, or Firm* — Oblon, Spivak, McClelland, Maier & Neustadt, L.L.P.

(57) ABSTRACT

In an in-vehicle audio/visual apparatus which displays an external device screen of an external media player on a display unit, a communication unit is configured to communicate with an external media player. An external device screen displaying unit is configured to select one of a plurality of external device screens in accordance with the external media player and display the selected external device screen on the display unit.

5 Claims, 8 Drawing Sheets

| DISPLAY PART ID | LAYOUT INFORMATION | FORM INFORMATION | CONTROL INFORMATION |
|---|---|---|---|
| 51 | (○○、○○) | 51.BMP | — |
| 52 | (××、××) | 52.BMP | — |
| 53 | (POSITION INFORMATION) | 53.BMP | — |
| 54 | (△△、△△) | 54.BMP | REVERSE |
| 55 | (○○、○○) | 55.BMP | PAUSE |
| 56 | (△△、△△) | 56.BMP | PLAYBACK |
| 57 | (××、××) | 57.BMP | FORWARD |
| 58 | (□□、□□) | 58.BMP | — |
| 59 | (△△、△△) | 59.BMP | — |
| 60 | (○○、○○) | 60.BMP | — |

FIG.5B

| FORM INFORMATION DATABASE | |
|---|---|
| 51.BMP | □ |
| 52.BMP | ◉ |
| 53.BMP | ◆ |
| 54.BMP | ◁◁ |
| 55.BMP | □▷ |
| 56.BMP | ▷▷ |
| 57.BMP | ▭ |
| 58.BMP | BLANK (TITLE) |
| 59.BMP | BLANK (ARTIST NAME) |
| 60.BMP | BLANK (PLAYBACK TIME) |

IN-VEHICLE AUDIO/VISUAL APPARATUS

BACKGROUND OF THE INVENTION

1. Field of the Invention

This invention relates to an in-vehicle audio/visual apparatus which displays an external device screen of an external media player on a display unit.

2. Description of the Related Art

An automotive vehicle usually has an audio device installed therein, and a passenger who rides in the vehicle may sometimes carry a portable media player which is capable of playing and recording a music or video of a recording medium. It is thus demanded that the passenger is enabled to play a music recorded in the portable media player while riding in the vehicle. For this purpose, a technology which interconnects a portable media player and an audio device and enables operation of the portable media player on the audio device is proposed. For example, refer to Japanese Laid-Open Patent Application No. 2001-128280.

In a case of the audio device of Japanese Laid-Open Patent Application No. 2001-128280, the portable media player is connected to the audio device to establish communications therebetween, an operation signal generated by a user on an operation part of the audio device is transmitted from the audio device to the portable media player, and, in response to the operation signal, the portable media player transmits display information to the audio device. The audio device is arranged to display an operational status of the portable media player on a display part of the audio device, and a user interface of the portable media player can be arranged on the audio device.

However, portable media players generally differ in the functions and operating methods depending on the manufacturers of the respective portable media players, and it is difficult to perform operations, other than the fundamental operations, such as "playback" and "song choice", on the audio device. In this connection, an information terminal device is proposed which manages access to a list of registered points which are stored beforehand on the basis of identification information (owner) of each of mobile phones, and displays a registered point editing screen. For example, refer to Japanese Laid-Open Patent Application No. 11-0168574.

It is conceivable that if the information terminal device of Japanese Laid-Open Patent Application No. 11-0168574 is applied to an audio device, an external device screen may be varied on a mobile phone (or portable media player) basis.

However, the information terminal device of Japanese Laid-Open Patent Application No. 11-0168574 merely displays a screen of a registered point which differs on a mobile phone basis. Since the portable media players of respective manufacturers differ in the functions and operating methods, displaying of the operation items corresponding to the functions and operating methods would confuse the passenger, and it would be unclear to the passenger as to which operation item among the displayed operation items corresponds to the desired function of the portable media player and as to what operation should be performed on the display screen.

SUMMARY OF THE INVENTION

In one aspect of the invention, the present disclosure provides an improved in-vehicle audio/visual apparatus in which the above-described problems are eliminated.

In one aspect of the invention, the present disclosure provides an in-vehicle audio/visual apparatus which displays an intelligible external device screen on a portable media player basis, enabling a user who rides in the vehicle to easily operate the portable media player on the in-vehicle audio/visual apparatus.

In an embodiment of the invention which solves or reduces one or more of the above-mentioned problems, an in-vehicle audio/visual apparatus is provided which displays an external device screen of an external media player on a display unit, the in-vehicle audio/visual apparatus comprising: a communication unit configured to communicate with an external media player; and an external device screen displaying unit configured to select one of a plurality of external device screens in accordance with the external media player and display the selected external device screen on the display unit.

The above-mentioned in-vehicle audio/visual apparatus may be arranged so that, when screen information of an external device screen is stored in the external media player, the external device screen displaying unit displays the external device screen on the display unit using the screen information received from the external media player by the communication unit.

The above-mentioned in-vehicle audio/visual apparatus may be arranged to further comprise a storage unit which stores respective screen information items of the plurality of external device screens each associated with identification information of an external media player, wherein the external device screen displaying unit extracts a screen information item from the storage unit based on identification information received from the external media player by the communication unit, and displays the extracted external device screen on the display unit using the received screen information.

The above-mentioned in-vehicle audio/visual apparatus may be arranged so that each of the plurality of external device screens includes: an operation position detecting part for receiving an operation position in the external device screen; and an indication part for displaying at least a part of either an appearance of the external media player or a configuration of an operation unit, and the in-vehicle audio/visual apparatus further comprises an operation signal transmitting unit configured to transmit to the external media player an operation signal, corresponding to the operation unit, based on the operation position when operation of the indication part on the external device screen is detected by the operation position detecting unit.

The above-mentioned in-vehicle audio/visual apparatus may be arranged so that the external device screen displaying unit is configured to display reproducing information, containing a playback time of playback data reproduced by the external media player, in the selected external device screen.

According to the embodiments of the invention, it is possible to provide an in-vehicle audio/visual apparatus which displays an intelligible external device screen on a portable media player basis, enabling a user who rides in the vehicle to easily operate the portable media player on the in-vehicle audio/visual apparatus.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of embodiments of the invention with reference to the accompanying drawings.

Figure 1:
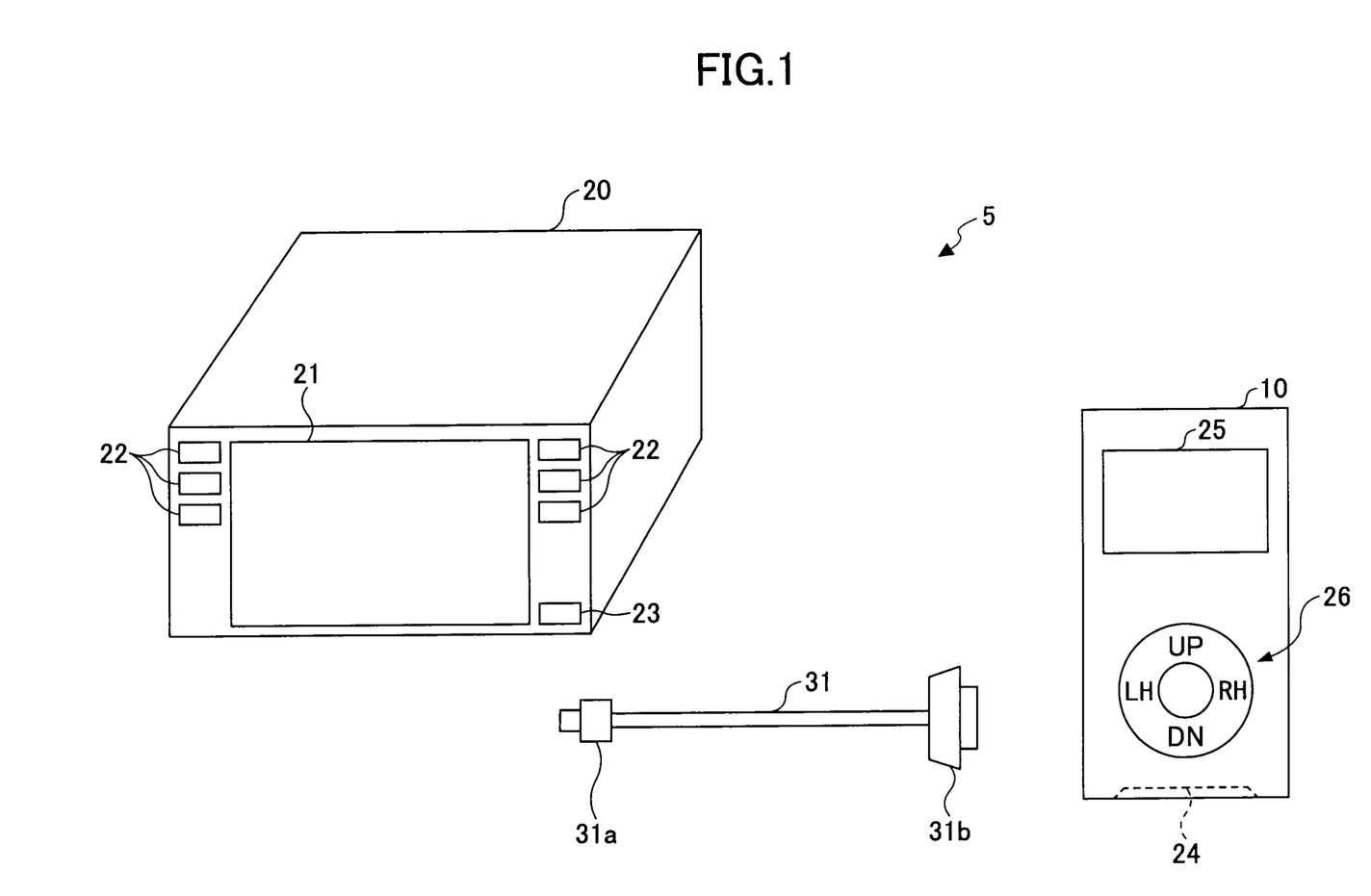
FIG. 1 is a perspective view showing the composition of an AV system which includes a portable media player and an in-vehicle AV apparatus in an embodiment of the invention.

FIG. 1 shows the composition of an AV (audio/visual) system 5 which includes a portable media player 10 and an in-vehicle audio/visual apparatus (called in-vehicle AV apparatus) 20 in an embodiment of the invention. Typically, the AV system 5 is arranged in a passenger compartment of an automotive vehicle.

In the in-vehicle AV apparatus 20 of this embodiment, a plurality of screen information items which indicate a plurality of external device screens of various portable media players 10 respectively are stored in advance. When a portable media player 10 is connected, the connected portable media player 10 is identified. Then, an external device screen for exclusive use with the connected portable media player 10 is selected from among the stored external device screens, and the selected one is displayed on a display unit 21 of the in-vehicle AV apparatus 20.

When a screen information item indicating an external device screen of the connected portable media player 10 is not stored in the in-vehicle AV apparatus 20, the screen information item of the external device screen is transmitted from the portable media player 10 to the in-vehicle AV apparatus 20 after a connection between the portable media player and the in-vehicle AV apparatus 20 is established. An external device screen for exclusive use with the connected portable media player 10 can be displayed in the in-vehicle AV apparatus 20.

The in-vehicle AV apparatus 20 may be disposed in a 2DIN front console in an automotive vehicle so that the display unit 21 is located on a passenger side of the vehicle. An operation unit 22 of the in-vehicle AV apparatus 20 is arranged at a neighboring portion of the display unit 21, so that the operation unit 22 constitutes a user interface for a passenger who rides in the vehicle.

The operation unit 22 may include operation keys, a dial, a pointing device (such as a track pointer or a mouse) and a microphone for voice operation. Alternatively, a remote control unit may be provided in the in-vehicle AV apparatus 20 as the operation unit 22.

The display unit 21 displays an image of television broadcasting or an image of DVD (digital versatile disk) in accordance with the operating state of the in-vehicle AV apparatus 20. In a case where the display unit 21 operates as a display unit of a navigation system, a road map is displayed on the display unit 21.

It is preferred that the display unit 21 of the in-vehicle AV apparatus 20 is constituted by a touch panel so that it is directly operated by the passenger. The display unit 21 of this embodiment is arranged so that a pointer is moved in the display unit 21 in accordance with operation of the operation unit 22 by the passenger. Therefore, an operation position in the display unit 21 (touch panel) which is directly operated by the passenger may be detected by the in-vehicle AV apparatus 20. In the following, the operation of the operation unit 22 may be referred to as operation using the touch panel (the display unit 21) by the passenger.

In the portable media player 10, a display unit 25 and an operation unit 26 are arranged to constitute a user interface. In the display unit 25, a set of selectable menu items, a set of artist names of reproducible music and image, source information, such as a playback time, etc. are displayed. During playback of a selected music or image, a title, an artist name, the current playback time (the remaining playback time), and a playback position in the total playback time (these information items are reproducing information) are displayed in the display unit 25.

The in-vehicle AV apparatus 20 and the portable media player 10 may be interconnected by a connecting cable 31. The in-vehicle AV apparatus 20 includes a terminal 23, such as USB (universal serial bus), at a location exposed to the passenger compartment of the vehicle. The portable media player 10 includes a terminal 24, such as USB, on the bottom surface thereof.

A connector terminal 31a of the connecting cable 31 is attached to the terminal 23, while a connector terminal 31b of the connecting cable 31 is attached to the terminal 24. For example, control information from the in-vehicle AV apparatus 20 is transmitted to the portable media player 10 via a differential signal line of the connecting cable 31. Reproducing information (e.g., playback audio data and playback image data which will be mentioned later) of a music or an image reproduced by the portable media player 10 is transmitted to the in-vehicle AV apparatus 20 via the differential signal line of the connecting cable 31.

In the embodiment of FIG. 1, connection is made in accordance with USB interface. Alternatively, another wired connection, such as IEEE1394 interface or wireless connection, such as Bluetooth, may be used instead.

Once the portable media player 10 is connected to the in-vehicle AV apparatus 20, an external device screen 50 for operating the portable media player 10 can be displayed on the display unit 21 of the in-vehicle AV apparatus 20, which will be mention later.

Figure 2:
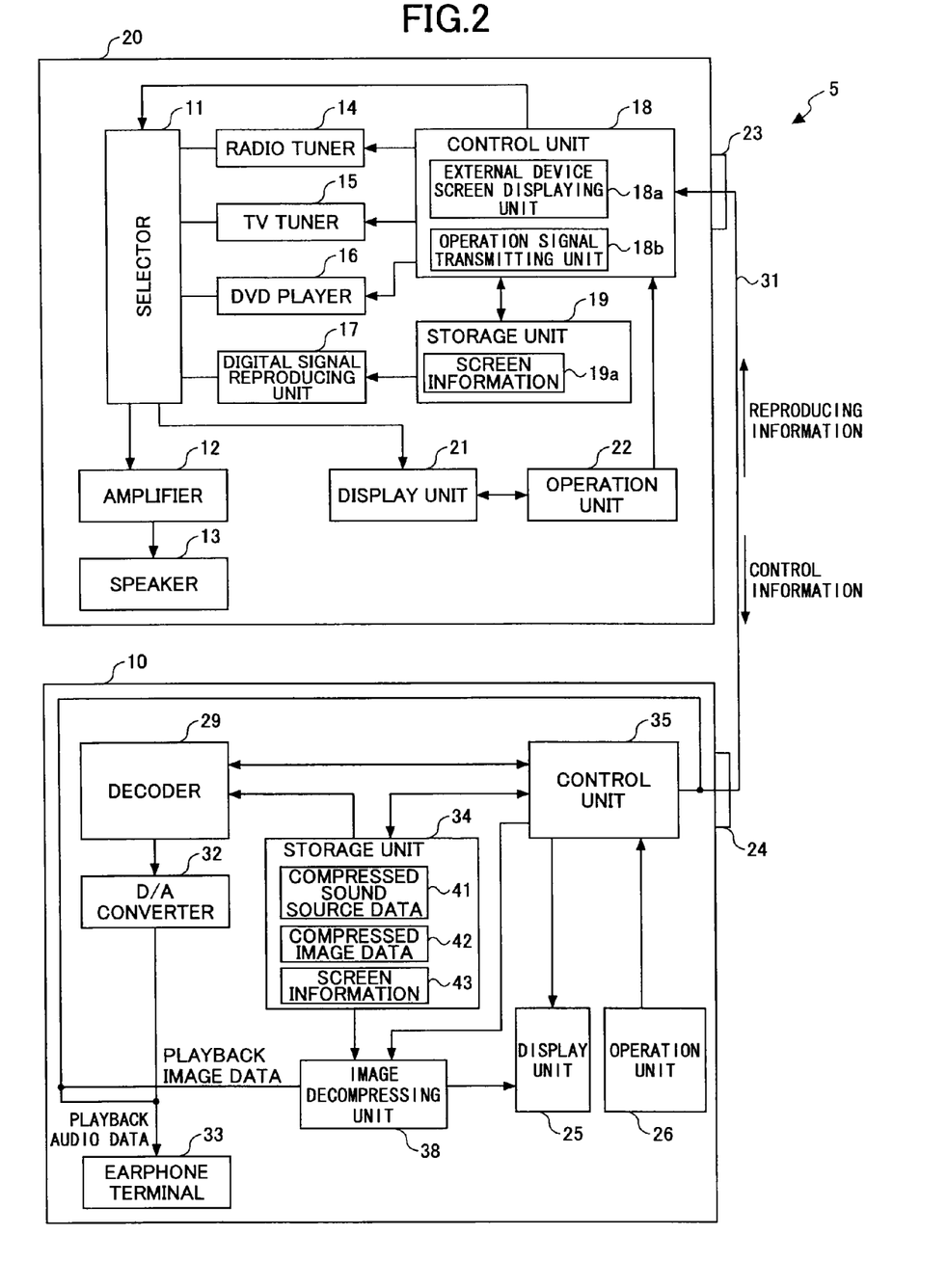
FIG. 2 is a block diagram showing the composition of the in-vehicle AV apparatus and the portable media player.

FIG. 2 shows the composition of the in-vehicle AV apparatus 20 and the portable media player 10.

The in-vehicle AV apparatus 20 is controlled by a control unit 18, and this control unit 18 is constituted by a microcomputer including CPU, RAM, ROM, etc. When operation of the operation unit 22 is performed by the passenger, the control unit 18 performs control processing of the respective elements so that the elements may operate according to the operation of the operation unit 22.

The CPU of the control unit 18 performs the program in the ROM to realize an external device screen displaying unit 18a and an operation signal transmitting unit 18b. The external device screen displaying unit 18a is configured to display the external device screen 50 of the portable media player 10 on the display unit 21 by using a screen information item 19a or 43. The operation signal transmitting unit 18b is configured to detect operation in the external device screen 50 displayed on the display unit 21, and transmit an operation signal based on the detected operation to the portable media player 10.

The in-vehicle AV apparatus 20 is arranged to output compressed sound source data, such as radio, TV, DVD, MP3, which is selected as a media source. The in-vehicle AV apparatus 20 includes a radio tuner 14, a TV tuner 15, a DVD player 16, and a digital signal reproducing unit 16.

In the display unit 21, a list of these media sources is displayed to allow the passenger to select one media source from the list. During output of the selected media source, an indication of the output media source is displayed on the display unit 21. Alternatively, a status of a broadcast signal received from a television station or a radio station in accordance with a selected media source may also be displayed during output of the selected media source.

The radio tuner 14 receives an analog/digital broadcast signal of a tuned broadcasting station (for example, AM or FM broadcast signal) using a predetermined antenna. The radio tuner 14 outputs an audio signal, which is generated by demodulating the signal of the tuned broadcasting station, to the selector 11.

The TV tuner 15 receives an analog/digital broadcast signal of a tuned broadcasting station (for example, an analog/digital ground broadcast signal or so-called one-segment broadcast signal) using a predetermined antenna. The TV tuner 15 adjusts the receiving sensitivity based on the intensity of the radio wave received from the broadcasting station, and outputs the image signal and the audio signal which are separated according to the frequency, to the selector 11.

The DVD player 16 reads a digital signal from a DVD which is inserted into the DVD player 16 from a predetermined slot thereof, decodes the audio signal, such as PCM, and the image signal, such as MPEG2, respectively, and converts them into an analog signal. The DVD player 16 outputs the resulting analog signal to the selector 11.

The digital signal reproducing unit 17 decodes a compressed sound source data which is stored in the storage unit 19 or a removable recording medium, and outputs the resulting audio signal to the selector 11.

The selector 11 and the control unit 18 are connected to each other. The reproducing data (playback audio data, playback image data) from the portable media player 10 can be output directly to the selector 11 through the control unit 18.

For example, when the output media source, such as the radio source, is requested from the operation unit 22, the control unit 18 chooses the requested audio signal and image signal from among the audio signals and the image signals input to the selector 11, so that the requested audio signal and image signal are output to the amplifier 12 and the display unit 21, respectively.

After the amplitude of the input audio signal is amplified by the amplifier 12, the amplified audio signal is output to the in-vehicle speaker 13. Moreover, an image is displayed on the display unit 21 in accordance with the image signal input to the display unit 21.

The portable media player 10 is controlled by the control unit 35, and this control unit 35 is constituted by a microcomputer including CPU, RAM, ROM, etc. When operation of the operation unit 26 is performed by the passenger, the control unit 35 performs control processing of the respective elements so that the elements may operate according to the operation of the operation unit 26.

The storage unit 34 is constituted by a flash memory or a hard disk, and compressed sound source data 41, such as MP3, is stored in the storage unit 34. In accordance with the operation by the passenger, the control unit 35 requests reading of the compressed sound source data 41 from the storage unit 34 to the decoder 29. Since compression for the compressed sound source data 41 is performed according to the predetermined compression method (MP3), the decoder 29 performs decoding processing of the compressed sound source data 41 according to the compression method. The decompressed digital data is input to the D/A converter 32, and the D/A converter 32 converts the digital data into the playback audio data.

The playback audio data is output to the earphone terminal 33, and a part of the line to the earphone terminal 33 is branched and connected to the terminal 24. Therefore, while the playback audio data is output directly to the earphone terminal 33, the playback audio data is output to the speaker 13 of the in-vehicle AV apparatus 20 when the portable media player 10 is connected to the in-vehicle AV apparatus 20 by the connecting cable 31.

Compressed image data 42, such as JPEG, MPEG, etc. is stored in the storage unit 34, and, in accordance with the operation by the passenger, the control unit 35 requests reading of the compressed image data 42 from the storage unit 34 to the image decompressing unit 38. Since compression for the compressed image data 42 is performed according to the predetermined compression method, the image decompressing unit 38 performs decompressing processing of the compressed image data 42 according to the compression method. The decompressed image data is input to the display driver of the display unit 25 and the brightness and color of the image are determined for every pixel, so that an image is displayed on the display unit 25.

The playback image data is connected to the terminal 24 separately from the display unit 25. Therefore, while the playback image data is output directly to the display unit 25, the playback image data is output to the display unit 21 of the in-vehicle AV apparatus 20 when the portable media player 10 is connected to the in-vehicle AV apparatus 20 by the connecting cable 31.

When the playback audio data or the playback image data is output to the in-vehicle AV apparatus 20, the same reproducing information is transmitted to the in-vehicle AV apparatus 20 also. And the in-vehicle AV apparatus 20 is able to display the reproducing information of the playback audio data or the playback image data on the display unit 21, while the playback audio data or the playback image data is output to the speaker 13 or the display unit 21.

A screen information item 43 specific to the portable media player 10 is stored in the storage unit 34. This screen information item 43 has a data structure that is the same as that of the screen information item 19a. However, for the purpose of distinguishing them, the screen information items 19a and 43 are designated by different reference numerals. The screen information items 19a and 43 will be described later.

Next, a description will be given of an external device screen 50 of the portable media player 10 which is displayed on the display unit 21 by the in-vehicle AV apparatus 20 of this embodiment.

The in-vehicle AV apparatus 20 of this embodiment is arranged to select one of a plurality of external device screens 50 in accordance with the portable media player 10 connected to the in-vehicle AV apparatus 20. For this purpose, a plurality of screen information items 19a which respectively indicate a plurality of external device screens 50 for a plurality of portable media players 10 are stored in the storage unit 19.

Figure 3A:
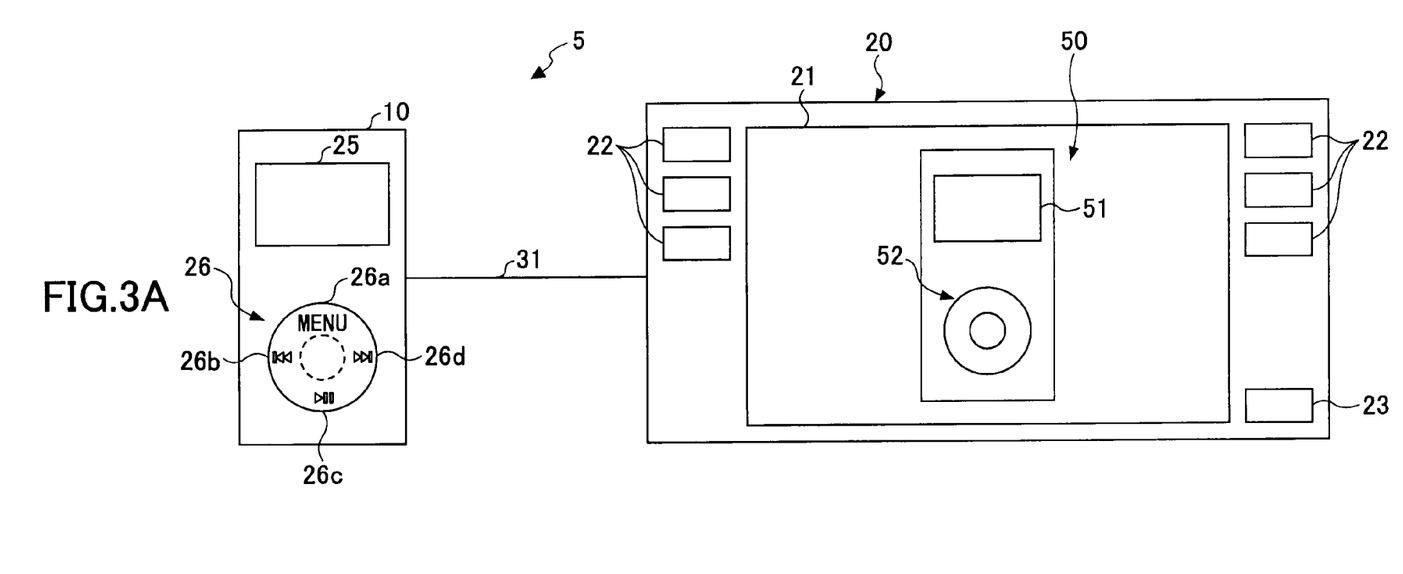
FIG. 3A and FIG. 3B are diagrams showing an example of the external device screen displayed on the display unit when an A-company model 123 portable media player is connected.

FIG. 3A shows an example of an external device screen 50 which is displayed on the display unit 21 when an A-company model 123 portable media player 10 is connected.

In the example of FIG. 3A, the external device screen 50 indicates the appearance of the front of the A-company model 123 portable media player 10 and is displayed on the display unit 21. For example, the external device screen 50 may be a photographic image of the A company model 123 or an illustration thereof.

Since the display position of the external device screen 50 on the display unit 21 is known to the control unit 18, the operation signal transmitting unit 18b is able to detect what kind of operation is performed to the portable media player 10 by the passenger, based on the position information indicating the position on the display unit 21 which is touched by the passenger.

Suppose that the operation unit 26 of the portable media player 10 includes a MENU button 26a at the top position, a reverse button 26b at the left-hand position, a playback/pause button 26c at the bottom position, and a forward button 26d at the right-hand position as shown in FIG. 3A. In this case, if the bottom position in the display part 52 of the external device screen 50, which is equivalent to the bottom position of the operation unit 26, is touched by the passenger, the operation signal transmitting unit 18b detects that operation of the playback/pause button 26c with respect to the portable media player 10 has been performed, and transmits the playback/pause control information to the portable media player 10.

Figure 3B:
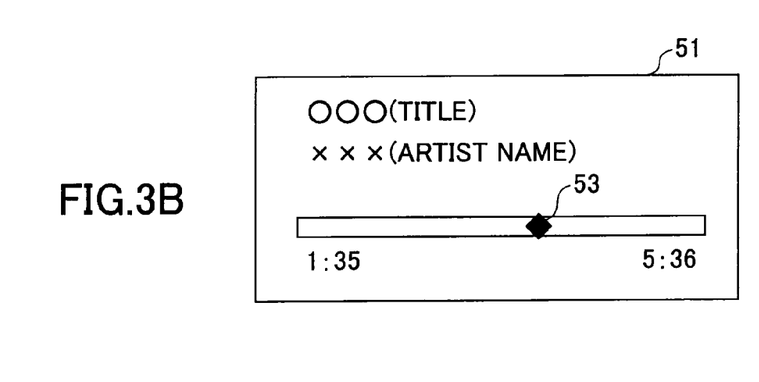

Moreover, during reproduction of the playback audio data, the external device screen displaying unit 18a displays the title, the artist name, the current playback time (in the case of FIG. 3B, "1:35"), the total playback time (in the case of FIG. 3B, "5:36"), the display part 53 indicating the current playback position, etc., which are received as the reproducing information, on the display part 51 of the external device screen 50 which is equivalent to the display unit 25 of the portable media player 10, as shown in FIG. 3B.

Accordingly, the passenger is able to master the functions, which are the same as the functions of the portable media player 10, by using a similar operation system, and is able to recognize the reproducing information, which is the same as that of the portable media player 10, on the display unit 21 of the in-vehicle AV apparatus 20.

As described above, a screen information item 19a, indicating the external device screen 50 as shown in FIG. 3A, is stored in the storage unit 19 on a portable media player basis. The external device screen displaying unit 18a is configured to display the external device screen 50, which is extracted from the storage unit 19 based on the identification information of the portable media player 10 connected to the in-vehicle AV apparatus 20, on the display unit 21.

Since it is not necessary that the external device screen 50 displayed on the display unit 21 completely coincides with the appearance of the portable media player 10, it is preferred to display an external device screen 50 that enables the passenger to easily operate the portable media player 10 connected to the in-vehicle AV apparatus 20.

Figure 4:
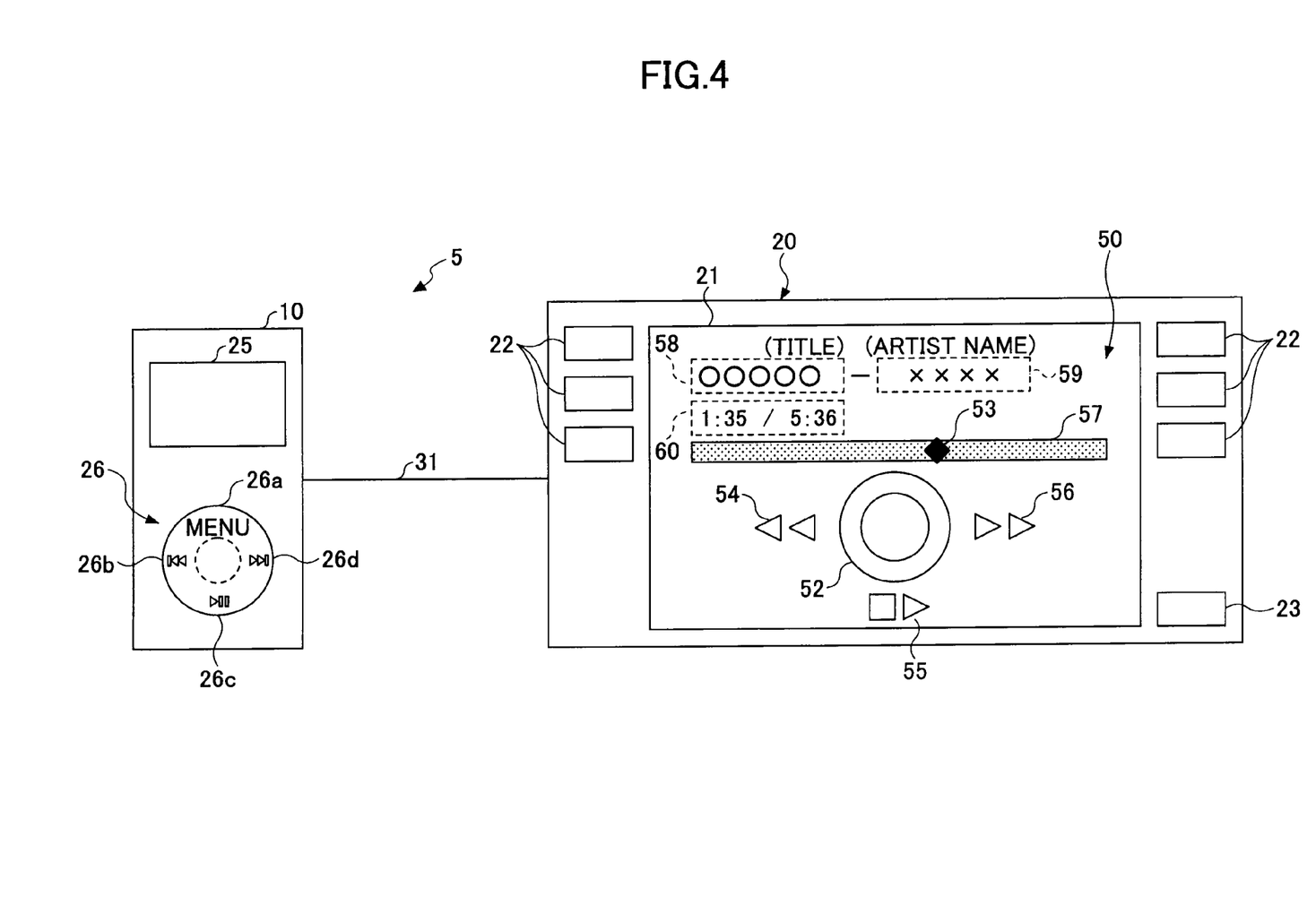
FIG. 4 is a diagram showing an example of the external device screen displayed on the display unit when an A-company model 123 portable media player is connected.

FIG. 4 shows an example of the external device screen 50 displayed on the display unit 21, when an A-company model 123 portable media player 10 is connected. In FIG. 4, the element which are the same as corresponding elements in FIG. 3A are designated by the same reference numerals, and a description thereof will be omitted.

In the example of FIG. 4, the external device screen 50 which indicates the appearance of the front of the A-company model 123 portable media player 10 is not displayed. Instead, a set of display parts 52, 54, 55 and 56 indicating the form of the operation unit 26 of the portable media player 10, and a set of display parts 53 and 57-60 indicating the contents of the display unit 25 of the portable media player 10, are displayed.

Specifically, the operation unit 26 which is displayed on the external device screen 50 is constituted by the display parts 52, 54, 55 and 56. The reverse button 26b is indicated as the display part 54, the playback/pause button 26c is indicated as the display part 55, and the forward button 26d is indicated as the display part 56, respectively, which are arranged with respect to the display part 52 in the same manner as in the portable media player 10.

Moreover, what are displayed on the display unit 25 during reproduction of the playback audio data are also displayed in the external device screen 50, namely, the title is displayed at the display part 58, the artist name is displayed at the display part 59, the current playback time (in the case of FIG. 4, "1:35") and the total playback time (in the case of FIG. 4, "5:36") are displayed at the display part 60, and the playback position in the total playback time is displayed at the display parts 53.

Therefore, the external device screen 50 which is not exactly the same as that of the portable media player 10 but enables the passenger to easily imagine the operating method is displayed. The passenger is able to easily master the functions which are the same as those of the portable media player 10, and is able to recognize the reproducing information, which is the same as that of the portable media player 10, on the display unit 21 of the in-vehicle AV apparatus 20.

The display parts for displaying the external device screen 50 are stored in advance in the storage unit 19, and the external device screen displaying unit 18a displays them on the display unit 21 based on the identification information of the portable media player 10.

Figure 5A:
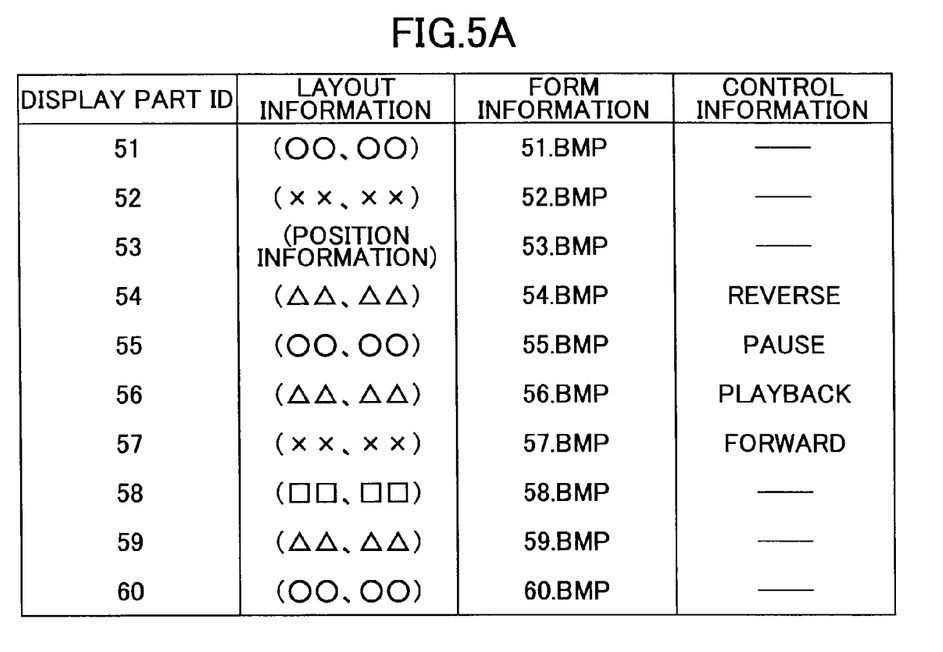
FIG. 5A and FIG. 5B are diagrams showing an example of screen information.
Figure 5B:
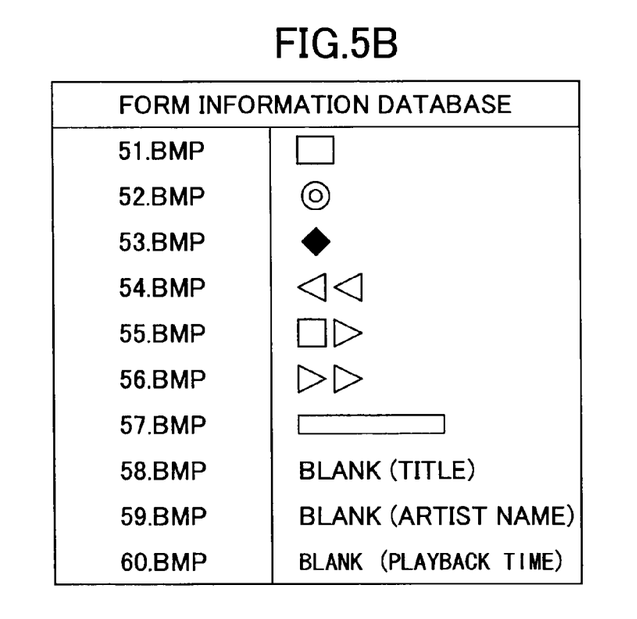

FIG. 5A and FIG. 5B show an example of the screen information items 19a and 43. Each of the screen information items 19a and 43 contains an external device screen table shown in FIG. 5A and a form information database shown in FIG. 5B.

In the external device screen table, layout information, form information, and control information each of which is associated with one of a plurality of display part IDs are stored. In the form information database, the form information of the display parts (for example, bit map data) constituting the external device screen 50, which is associated with the display part ID, is stored.

For example, the layout information of the external device screen table specifies the position of the upper left vertex of the circumscription rectangle of the form of each display part, with respect to the predetermined origin of the display unit 21. The control information indicates the specific operation of the operation unit 26 corresponding to the display part.

Therefore, the external device screen displaying unit 18a is able to display the display part which is specified by the form information, in the position which is specified by the layout information. The operation signal transmitting unit 18b detects the display part operated, based on the position information of the position of the display unit 21 which is touched by the passenger, and transmits the control information associated with the display part, to the portable media player 10.

Although the display parts 52-56 are fixed in the position, the playback position indicated at the display part 53 moves during reproduction. In order to display the display part 53, the external device screen displaying unit 18a receives predetermined position information at intervals of a given period and determines the position of the display part 53 in the external device screen 50 dynamically. For example, the position information of the display part 53 indicating the playback position is determined based on the ratio of the current playback time to the total playback time.

The contents of the title, the artist name and the playback time at the display parts 58, 59 and 60 are uncertain. Only the positions of these display parts are determined based on the layout information, and the form information thereof is initially set to blank as shown in FIG. 5B. The external device screen displaying unit 18a displays the predetermined contents (for example, a part of the reproducing information) at positions according to the layout information of the display parts 58, 59 and 60 the form information of which is blank. The layout information is predetermined for displaying each of the display part 58 where the title is indicated, the display part 59 where the artist name is indicated, and the display part 60 where the playback time is indicated. Therefore, the display parts the contents of which are uncertain can be displayed in the external device screen 50 of the in-vehicle AV apparatus 20 similar to that of the portable media player 10.

The external device screen 50 as shown in FIG. 4 is arranged in accordance with the function of the portable media player 10. For example, when playback image data is output in the in-vehicle AV apparatus 20, the external device screen 50 including an image which is the same as in the portable media player 10 during playback of the image data is displayed.

Figure 6:
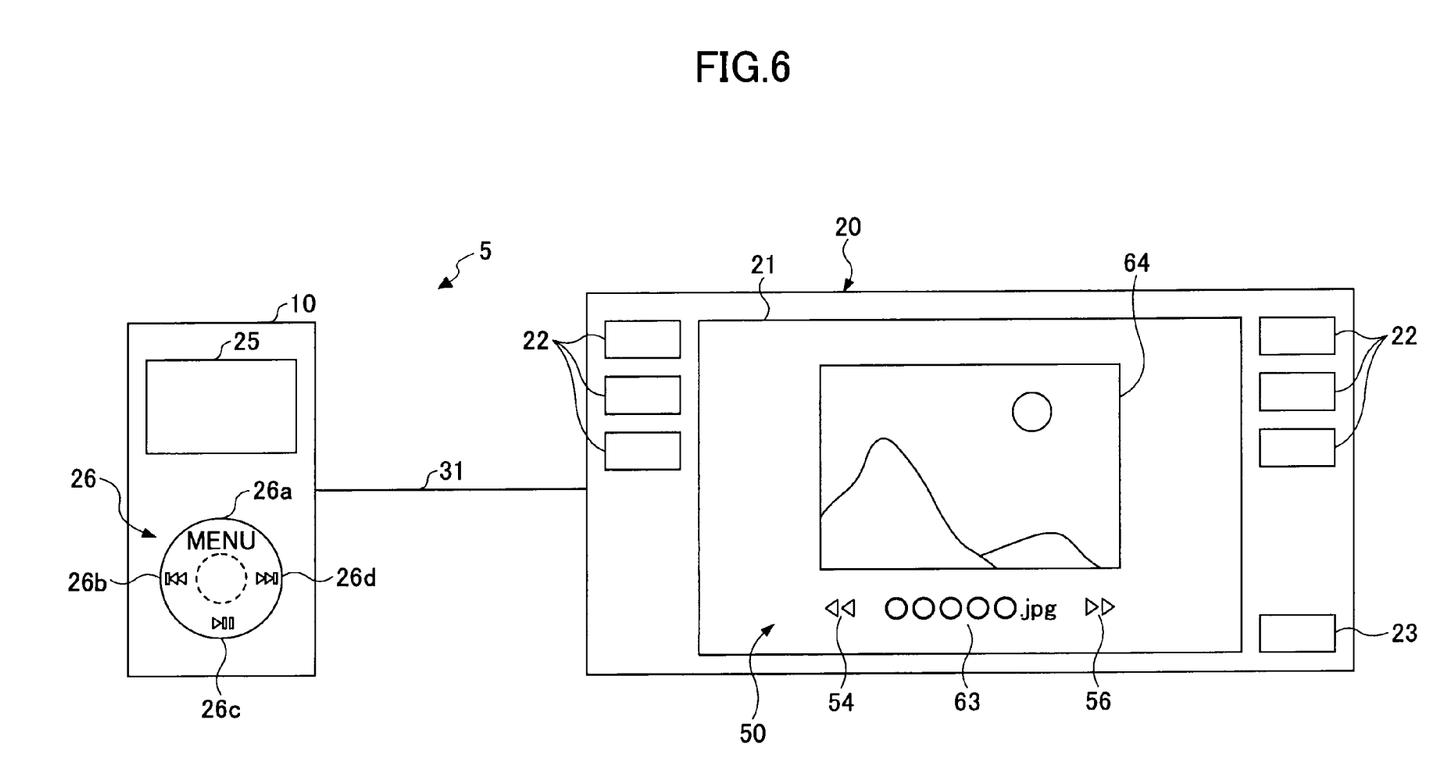
FIG. 6 is a diagram showing an example of the external device screen displayed on the display unit when playback image data from the A-company model 123 portable media player is output.

FIG. 6 shows an example of the external device screen 50 displayed on the display unit 21 when playback image data from the A-company model 123 portable media player 10 is output.

In the external device screen 50 of FIG. 6, a display part 63 indicating a file name of the image data which is arranged under the bottom line of a reproduced image 64 during reproduction is displayed.

The arrangement of the relative positions of the display parts 63 and 64 is the same as that of the portable media player 10 when an image is reproduced.

In the portable media player 10, if the reverse button 26b is pressed during reproduction of image data, the preceding image is displayed, and if the forward button 26d is pressed, the following image is displayed. In order to realize this operation on the display unit 21, the external device screen 50 of FIG. 6 is arranged so that a display part 54 indicating the reverse button 26b is displayed on the left-hand side of the display part 63 indicating the file name, and a display part 56 indicating the forward button 26d is displayed on the right-hand side of the display part 63. When the passenger touches one of the display parts 54 and 56, an image can be selectively displayed by the operating method which is the same as in the portable media player 10.

In a case of a small-size portable media player 10, it is difficult to arrange operation keys for each of the functions. In many cases, two or more operations are enabled by changing the method of operation of the operation unit 26 because of the restrictions in design. Moreover, operation keys may be arranged on not only the front surface but also the side or top surface of the portable media player 10. In the case of such a portable media player 10, a photograph or illustration which indicates the appearance of the side or top surface of the portable media player 10 may be displayed on the display unit 21 together with a photograph or illustration indicating the appearance of the front surface. Alternatively, a display part indicating a side view of the operation unit may be displayed.

Figure 7A:
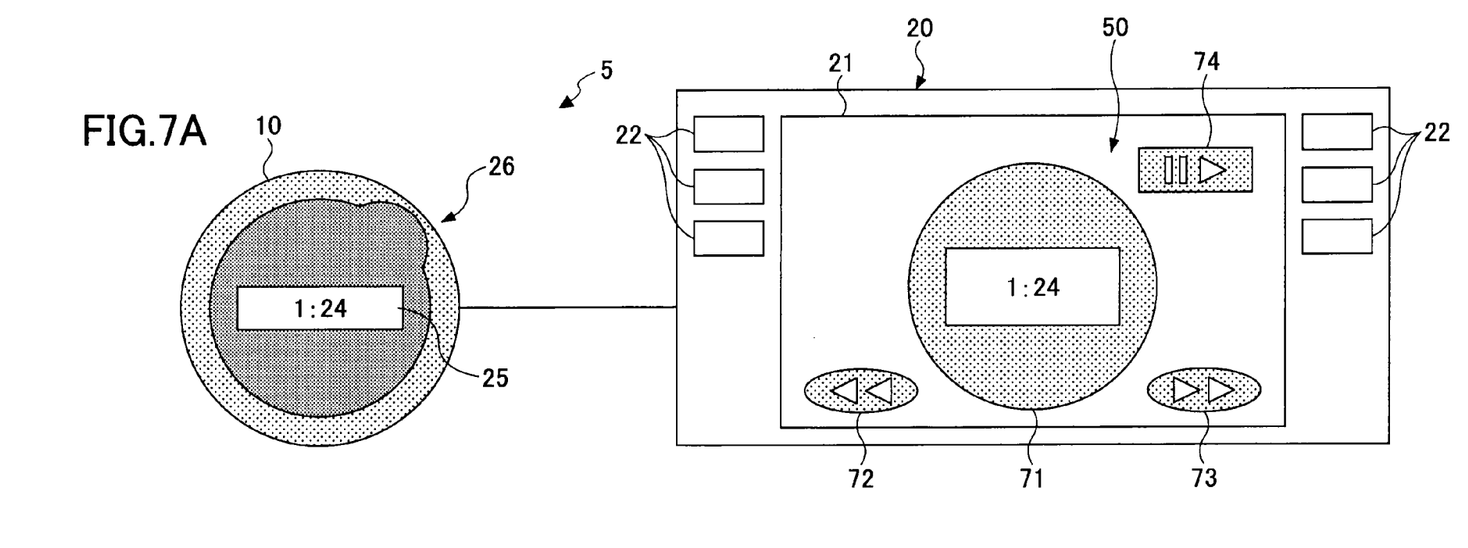
FIG. 7A and FIG. 7B are diagrams showing an example of the external device screen displayed on the display unit when a B-company model 456 portable media player is connected.
Figure 7B:
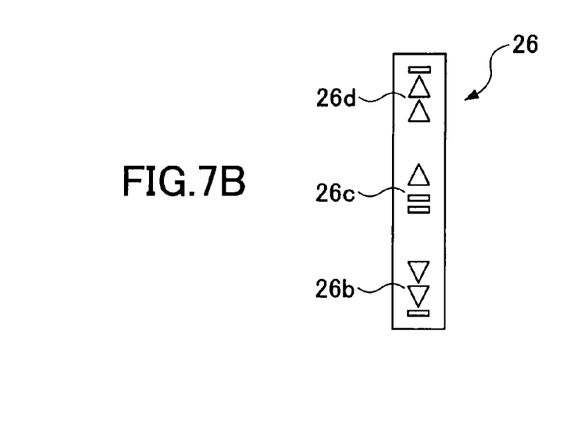

FIG. 7A shows an example of the external device screen 50 displayed on the display unit 21 when a B-company model 456 portable media player 10 is connected. FIG. 7B is a side view of the B-company model 456 portable media player 10.

As shown in FIG. 7B, the B-company model 456 portable media player 10 includes on its side surface a reverse button 26b, a play/pause button 26c, and a forward button 26d.

In the case of the portable media player 10 of FIG. 7A, if the external device screen 50 which indicates the front view of the portable media player 10 is displayed as shown in FIG. 3B, all the display parts which are equivalent to the operation unit 26 cannot be displayed.

In the external device screen 50 of FIG. 7A, a display part 71 which indicates the appearance of the front of the portable media player 10 is arranged in the center. Moreover, a display part 72 equivalent to the reverse button 26b and a display part 73 equivalent to the forward button 26d are arranged on the right-hand and left-hand sides of the display part 71, and a display part 74 equivalent to the playback/pause button 26c is arranged at the upper right corner. Therefore, the passenger is able to easily operate the external device screen 50 by using the operating method which is the same as in the portable media player 10.

According to the in-vehicle AV apparatus 20 of this embodiment, the external device screen 50 having the appearance which is almost the same as the portable media player 10 connected, or the external device screen 50 enabling the operating method which is common to the portable media player 10 is displayed. Therefore, even if the passenger carries any of various portable media players 10, the passenger who rides in the vehicle is able to easily operate the portable media player 10 on the display unit 21 by using the common operating method.

Even when the portable media player 10 has a special function specific to the portable media player 10, the display part equivalent to the special function can be displayed on the display unit 21. The passenger is able to use the special function by the common operating method as in the portable media player 10.

Taking into consideration the kinds and upgrades of portable media player 10, it may be difficult that the in-vehicle AV apparatus 20 stores a number of external device screens 50 for the respective portable media players 10.

To eliminate the problem, when a screen information item 19a of the portable media player 10 is not stored in the storage unit 19 of the in-vehicle AV apparatus 20, it is preferred that the in-vehicle AV apparatus 20 receives the screen information item 43 from the portable media player 10 and displays the same on the display unit 21.

Each portable media player 10 stores the screen information item 43 as shown in FIG. 5A and FIG. 5B in the storage unit 34 beforehand. When the portable media player 10 is connected to the in-vehicle AV apparatus 20, the portable media player 10 transmits the screen information item 43 to the in-vehicle AV apparatus 20 automatically or in response to a request from the in-vehicle AV apparatus 20. Since the format of the layout information or the form information database is the same, the in-vehicle AV apparatus 20 can display the display parts according to the layout information, so that the external device screen 50 is displayed.

For example, in a case of a succeeding model of the portable media player from the same manufacturer, the in-vehicle AV apparatus 20 may not store all the display parts in the screen information item 43. The in-vehicle AV apparatus 20 can display an external device screen 50 suitable for the succeeding model if the portable media player 10 of the succeeding model stores the layout information, the form information, and the control information with respect to the display parts equivalent to the newly added functions or operating methods.

Alternatively, the in-vehicle AV apparatus 20 may receive the screen information item 19a via a network. In this case, the screen information item 19a of each portable media player 10 is registered in a predetermined server beforehand. If each of individual users of portable media players 10 is able to register the screen information item 19a freely, the in-vehicle AV apparatus 20 can display the external device screen 50 using the screen information item 19*a* received via the network immediately after the new product is distributed in the market.

Once the external device screen 50 is displayed, the in-vehicle AV apparatus 20 stores the screen information item 19*a* of the external device screen 50 in the storage unit 19 with the screen information item 19*a* associated with the identification information of the portable media player 10. Therefore, when the same portable media player 10 is connected subsequently, the external device screen 50 can be displayed in accordance with the screen information item 19*a* stored in the storage unit 19.

When the screen information item 19*a* or 43 of the portable media player 10 connected is not stored in any of the in-vehicle AV apparatus 20, the portable media player 10 and the server, the external device screen 50 may be displayed using a predetermined default screen information.

Figure 8:
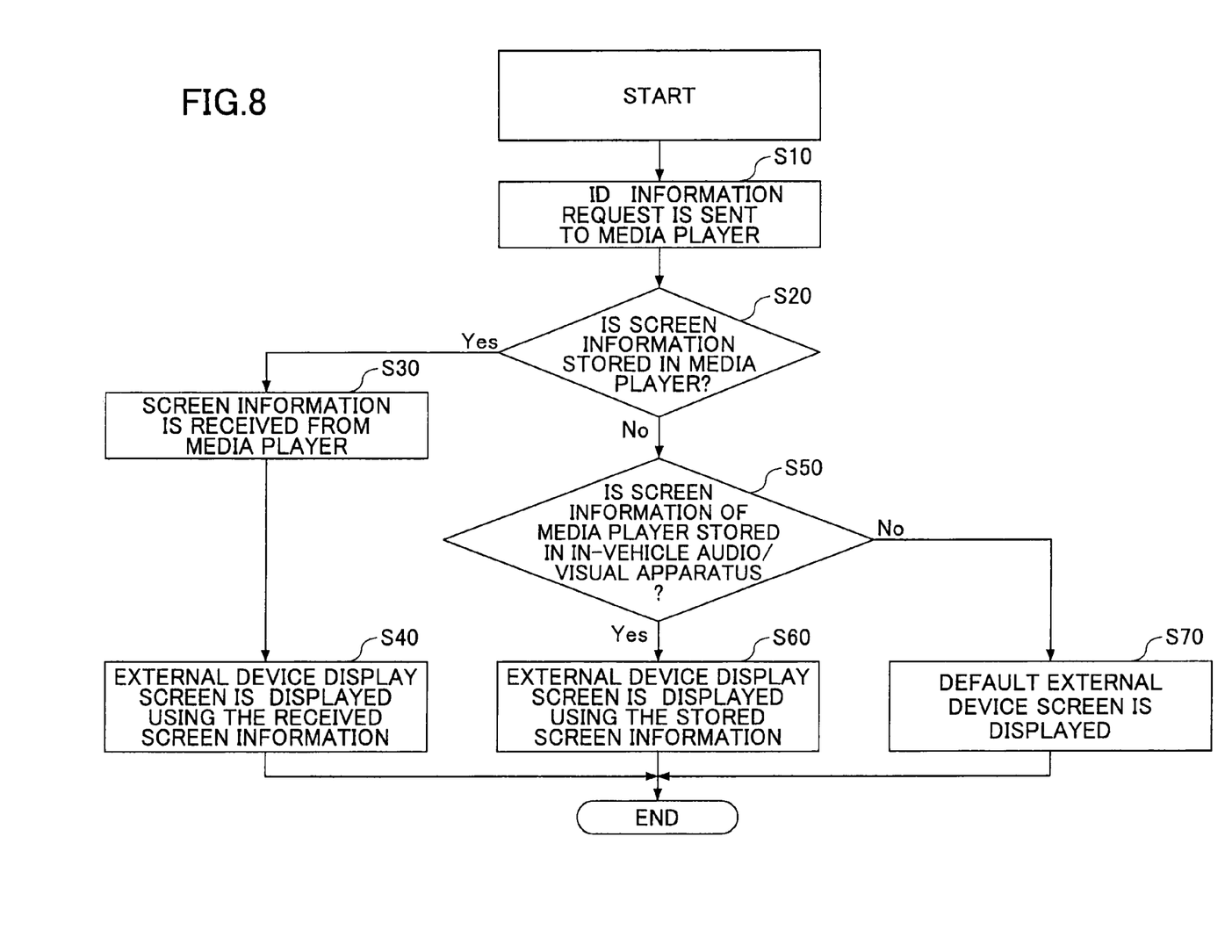
FIG. 8 is a flowchart for explaining the procedure in which an external device screen is displayed on the display unit by the external device screen displaying unit.

FIG. 8 is a flowchart for explaining the procedure in which an external device screen 50 is displayed on the display unit 21 by the external device screen displaying unit 18*a*.

For example, the procedure of FIG. 8 is started immediately after the in-vehicle AV apparatus 20 and the portable media player 10 are electrically connected.

When a connection between the portable media player 10 and the in-vehicle AV apparatus 20 is established, the control unit 18 transmits an identification information request to the portable media player 10 (S10). In response, the portable media player 10 reads out the identification information thereof stored in the ROM, and transmits the same to the in-vehicle AV apparatus 20.

When the identification information is received, the external device screen displaying unit 18*a* determines whether the currently connected portable media player 10 stores the screen information item 43 (S20). Specifically, the external device screen displaying unit 18*a* in this step transmits a screen information request to the portable media player 10, and, if the portable media player 10 stores the screen information item 43, the portable media player 10 returns the stored screen information item 43 to the external device screen displaying unit 18*a*.

Namely, when the portable media player 10 stores the screen information item 43 (Yes of S20), the external device screen displaying unit 18*a* receives the stored screen information item 43 from the portable media player 10 (S30).

Subsequently, the external device screen displaying unit 18*a* arranges the display parts of the screen information item 43, received from the portable media player 10, into the external device screen 50, and displays the external device screen 50 on the display unit 21 (S40).

On the other hand, if the portable media player 10 does not store the screen information item 43, the portable media player 10 returns an "NG" signal to the external device screen displaying unit 18*a*. Thus, when the external device screen displaying unit 18*a* receives the "NG" signal from the portable media player 10 in the step S20, it is determined that the portable media player 10 does not store the screen information item 43.

When the portable media player 10 does not store the screen information item 43 (No of S20), the external device screen displaying unit 18*a* determines whether the screen information item 19*a* of the currently connected portable media player 10 is stored in the storage unit 19 (S50). Specifically, the storage unit 19 is searched for the screen information item 19*a* based on the received identification information of the portable media player 10, and, if the screen information item 19*a* is discovered, the external device screen displaying unit 18*a* extracts the screen information item 19*a* from the storage unit 19.

When the in-vehicle AV apparatus 20 stores the screen information item 19*a* of the portable media player 10 (Yes of S50), the external device screen displaying unit 18*a* arranges the display parts of the screen information item 19*a*, extracted from the storage unit 19, into the external device screen 50, and displays the external device screen 50 on the display unit 21 (S60).

On the other hand, when the in-vehicle AV apparatus 20 does not store the screen information item 19*a* of the portable media player 10 (No of S50), the external device screen displaying unit 18*a* displays a predetermined default external device screen 50 on the display unit 21 (S70).

Accordingly, when the portable media player 10 stores the screen information item 43, the external device screen 50 is displayed by using the stored screen information item 43, and it is possible to display an external device screen 50 for exclusive use with the portable media player 10 on the display unit 21 certainly.

Even when the portable media player 10 does not store the screen information item 43, the external device screen 50 can be displayed on the display unit 21 by using the screen information item 19*a* stored in the in-vehicle AV apparatus 20.

Therefore, even through the portable media players differ in the functions and operating methods depending on the manufacturer of each portable media player, the passenger can easily operate the connected portable media player 10 on the in-vehicle AV apparatus 20. Even if the portable media player 10 has a special function, such as image reproduction, the special function can be easily operated according to the operating method that is the same as that of the portable media player 10.

The present invention is not limited to the above-described embodiments, and variations and modifications may be made without departing from the scope of the invention.

The present application is based upon and claims the benefit of priority of Japanese patent application No. 2007-114408, filed on Apr. 24, 2007, the contents of which are incorporated herein by reference in their entirety.

What is claimed is:

1. An in-vehicle audio/visual apparatus which displays an external device screen of an external media player on a display unit, comprising:
   a communication unit configured to communicate with the external media player connected to the in-vehicle audio/visual apparatus; and
   an external device screen displaying unit configured to select one of respective external device screens of various external media players which reproduce playback data from a media source, in accordance with currently connected external media player, and display the selected external device screen, including an image of an appearance of the currently connected external media player, on the display unit, the displaying the external device screen including replicating a manner in which information is displayed on a display screen of the currently connected external media player during reproduction,
   wherein
   the image of the appearance of the currently connected external media player includes both a body section and a screen section, the screen section is dynamic and replicates the manner in which information is displayed on the display screen of the currently connected external media player during reproduction, the manner in which information is displayed on the display screen of the currently connected external media player during reproduction includes the position in which information is displayed on the display screen of the currently connected external media player, and the body section is an image having the appearance of the currently connected external media player with the screen section embedded within the body section, the body section and the screen section each representing a portion of the currently connected external media player such that the body section and the screen section change in response to connecting a different one of the various external media players.

2. The in-vehicle audio/visual apparatus according to claim 1, wherein, when screen information of an external device screen is stored in the external media player, the external device screen displaying unit displays the external device screen on the display unit using the screen information received from the external media player by the communication unit.

3. The in-vehicle audio/visual apparatus according to claim 1, further comprising:

a storage unit which stores respective screen information items of the external device screens each associated with identification information of an external media player, wherein the external device screen displaying unit extracts an external device screen from the storage unit based on identification information received from the external media player by the communication unit, and displays the extracted external device screen on the display unit using the received screen information.

4. The in-vehicle audio/visual apparatus according to claim 1, wherein each of the external device screens includes:

an operation position detecting part that receives an operation position in the external device screen; and an indication part that displays a configuration of an operation unit, and wherein the in-vehicle audio/visual apparatus further comprises an operation signal transmitting unit configured to transmit to the external media player an operation signal, corresponding to the operation unit, based on the operation position when operation of the indication part on the external device screen is detected by the operation position detecting part.

5. The in-vehicle audio/visual apparatus according to claim 1, wherein the external device screen displaying unit is configured to display reproducing information, containing a playback time of playback data reproduced by the external media player, in the selected external device screen.

\* \* \* \* \*